(12) United States Patent
Zhang

(10) Patent No.: US 10,484,067 B2
(45) Date of Patent: Nov. 19, 2019

(54) METHOD AND DEVICE IN UE AND BASE STATION USED FOR WIRELESS COMMUNICATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/031,824

(22) Filed: Jul. 10, 2018

(65) Prior Publication Data

US 2019/0020394 A1 Jan. 17, 2019

(30) Foreign Application Priority Data

Jul. 12, 2017 (CN) .......................... 2017 1 0565897

(51) Int. Cl.
| | |
|---|---|
| *H04B 7/06* | (2006.01) |
| *H04W 56/00* | (2009.01) |
| *H04W 76/19* | (2018.01) |
| *H04B 7/08* | (2006.01) |

(52) U.S. Cl.
CPC ......... *H04B 7/0626* (2013.01); *H04B 7/0695* (2013.01); *H04B 7/088* (2013.01); *H04W 56/001* (2013.01); *H04W 56/0095* (2013.01); *H04W 76/19* (2018.02)

(58) Field of Classification Search
CPC .... H04B 7/0626; H04B 7/0695; H04B 7/088; H04W 76/19; H04W 56/001; H04W 56/0095

See application file for complete search history.

(56) References Cited

U.S. PATENT DOCUMENTS

| | | | | |
|---|---|---|---|---|
| 10,257,070 | B2* | 4/2019 | Zhang | H04L 43/16 |
| 2018/0227887 | A1* | 8/2018 | Hakola | H04B 7/022 |
| 2018/0302889 | A1* | 10/2018 | Guo | H04W 72/046 |
| 2018/0323856 | A1* | 11/2018 | Xiong | H04B 7/0695 |
| 2018/0368009 | A1* | 12/2018 | Xia | H04B 7/0695 |

\* cited by examiner

*Primary Examiner* — Freshteh N Aghdam

(74) *Attorney, Agent, or Firm* — Maschoff Brennan

(57) ABSTRACT

A method and a device in a User Equipment and a base station used for wireless communication. The UE receives a target radio signal and transmits first information on a target channel in turn. A channel measurement for the target radio signal is used for triggering the transmission of the first information. The target channel is a first type of physical layer channel or a second type of physical layer channel. If the target channel is the first type of physical layer channel, the transmission of the first information on the target channel is counted into the number of transmission times of the first information. Otherwise, the number of transmission times of the first information is unrelated to the transmission of the first information on the target channel. The present disclosure improves the success rate of retransmission, supports flexible configuration, and saves the transmit power consumption of the UE.

18 Claims, 10 Drawing Sheets

METHOD AND DEVICE IN UE AND BASE STATION USED FOR WIRELESS COMMUNICATION

CROSS REFERENCE TO RELATED APPLICATION

This application claims the priority benefit of Chinese Patent Application Serial Number 201710565897.6, filed on Jul. 12, 2017, the full disclosure of which is incorporated herein by reference.

BACKGROUND

Technical Field

The present disclosure relates to transmission schemes of radio signals in wireless communication systems, and in particular to a method and a device for multi-antenna transmission.

Related Art

Massive Multi-Input Multi-Output (MIMO) becomes a research hotspot of next-generation mobile communications. In the massive MIMO, multiple antennas experience beamforming to form a relatively narrow beam which points to a particular direction to improve the quality of communication. Analog beamforming is applied to the massive MIMO system to obtain massive antenna array gain with less radio frequency links. The application of analog beamforming has a restriction that the receiving equipment first selects an analog beam and then uses the selected analog beam to receive a radio signal.

In 3rd Generation Partner Project (3GPP) New Radio discussion, there is some company proposing to use a Physical Uplink Control Channel (PUCCH) and a Physical Random Access Channel (PRACH) like channel to transmit a beam recovery request when a User Equipment (UE) detects degrade of beam quality. If the UE does not receive a response from the base station within one time window after transmitting a beam recovery request, the UE retransmits the beam recovery request. If the UE still does not receive a response from the base station after multiple times of transmitting the beam recovery request, the UE should notify a high layer, so that the high layer decides whether to enter a Radio Link Failure (RLF) state and perform resynchronization.

SUMMARY

The inventor finds through researches that the PUCCH and the PRACH like channel are two different types of channels. The PRACH like channel has higher robustness than the PUCCH channel in information transmission. The PRACH like channel occupies aerial resources which are scarcer. The PUCCH which is configured to transmit other information can also be used to report a beam recovery request. In the case that both the PUCCH and the PRACH like channel can be used to transmit a beam recovery request, simply restricting the total number of retransmission times on the two types of channels would result in a problem that the beam recovery request is more likely to fail because the PRACH like channel which is more robust is not fully used. How to define the number of retransmission times of the beam recovery request according to the use of different types of channels therefore becomes a problem urgently needing to be addressed.

In view of the above problems, the present disclosure provides a solution. It should be noted that the embodiments of the present disclosure and the characteristics in the embodiments may be mutually combined if there is no conflict. For example, the embodiments of the UE of the present disclosure and the characteristics in the embodiments may be applied to the base station, and vice versa.

The present disclosure provides a method in a UE for wireless communication. The method includes the following steps of:

receiving a target radio signal; and
transmitting first information on a target channel.

Herein, a channel measurement for the target radio signal is used for triggering the transmission of the first information; the target channel is a first type of physical layer channel or a second type of physical layer channel; if the target channel is the first type of physical layer channel, the transmission of the first information on the target channel is counted into the number of transmission times of the first information; otherwise, the number of transmission times of the first information is unrelated to the transmission of the first information on the target channel; the number of transmission times of the first information, when reaching K, is used for triggering a transmission of second information to a high layer, wherein K is a positive integer.

In one embodiment, the above method is advantageous in that: the first type of physical layer channel is a physical layer channel having stronger robustness; the second type of physical layer channel has weaker robustness and is not necessary to restrict the number of retransmission times as an opportunity channel; and, restricting only the number of times the first type of physical layer channel is used to report the request can improve the success rate of retransmission.

In one embodiment, the target radio signal is a reference signal.

In one embodiment, the target radio signal is a Demodulation Reference Signal (DMRS).

In one embodiment, the target radio signal is a Channel State Information Reference Signal (CSI-RS).

In one embodiment, the target radio signal is a periodic CSI-RS.

In one embodiment, the target radio signal is a UE specific CSI-RS.

In one embodiment, the target radio signal is a Synchronization Signal (SS).

In one embodiment, the channel measurement for the target radio signal is used for a third channel.

In one embodiment, the third channel is a Physical Downlink Control Channel (PDCCH).

In one embodiment, the third channel is a Physical Downlink Shared Channel (PDSCH).

In one embodiment, the channel measurement refers to a Block Error Rate (BLER) calculation after mapping a received reference signal to the third channel.

In one embodiment, the multi-antenna related transmitting of the target radio signal is related to the multi-antenna related transmitting used for the third channel.

In one embodiment, the same transmitting beam is used to transmit the target radio signal and the third channel.

In one embodiment, the multi-antenna related receiving of the target radio signal is related to the multi-antenna related receiving used for the third channel.

In one embodiment, the same receiving beam is used to receive the target radio signal and the third channel.

In one embodiment, the target radio signal and the third channel are both spatially related to one same reference signal.

In one embodiment, the being spatially related refers to being spatially Quasi Co-Located (QCL).

In one embodiment, the being spatially related refers that big-scale channel characteristics are the same.

In one embodiment, the big-scale channel characteristic includes at least one of {Delay Spread, Doppler Spread, Doppler Shift, average of Angle of Arrival (AoA), and average of Angle of Departure (AoD)}.

In one embodiment, the being spatially related refers that two same transmitting beams are used to transmit two signals.

In one embodiment, the being spatially related refers that two same receiving beams are used to receive two signals.

In one embodiment, the transmitting beam is an analog transmitting beam.

In one embodiment, the receiving beam is an analog receiving beam.

In one embodiment, the channel measurement is to measure a Signal-to-Noise Ratio (SNR) of a received reference signal.

In one embodiment, the channel measurement is to measure a Reference Signal Received Power (RSRP) of a received reference signal.

In one embodiment, the result of the channel measurement is less than a first threshold, the transmission of the first information is triggered, and the first information is used for determining that the result of the channel measurement is less than the first threshold.

In one embodiment, the first threshold is default.

In one embodiment, the first threshold is preconfigured.

In one embodiment, the first information is used for determining multi-antenna related transmitting.

In one embodiment, the first type of physical layer channel is a PRACH like channel.

In one embodiment, the first type of physical layer channel is on a time-domain resource on which the PRACH is located.

In one embodiment, the first type of physical layer channel is a contention free PRACH like channel.

In one embodiment, the first type of physical layer channel is a PRACH channel based on contention resolution.

In one embodiment, a first signature sequence transmitted on the first type of physical layer channel is used for determining the first information.

In one embodiment, the first signature sequence is a Zadoff-Chu sequence.

In one embodiment, the first signature sequence is an m sequence.

In one embodiment, the first signature sequence is a pseudorandom sequence.

In one embodiment, the first signature sequence is Pseudo-Noise (PN) sequence.

In one embodiment, an aerial resource occupied by the first type of physical layer channel is related to the ID of the UE.

In one embodiment, the ID of the UE is a Radio Network Temporary Identity (RNTI).

In one embodiment, the ID of the UE is a Cell Radio Network Temporary Identity (C-RNTI).

In one embodiment, an aerial resource occupied by the first type of physical layer channel is used for determining the first information.

In one embodiment, the aerial resource includes at least one of {time-domain resource, frequency-domain resource, code-domain resource}.

In one embodiment, the second type of physical layer channel is a PUCCH.

In one embodiment, an aerial resource for the first type of physical layer channel is preconfigured.

In one embodiment, an aerial resource for the first type of physical layer channel is configured by a high layer.

In one embodiment, an aerial resource for the first type of physical layer channel is configured by an RRC signaling.

In one embodiment, the PDCCH is used for configuring a time-frequency resource on which the second type of physical layer channel used for transmitting the first information is located.

In one embodiment, the value of a bit block transmitted on the second type of physical layer channel is used for determining the first information.

In one embodiment, the first type of physical layer channel is more robust than the second type of physical layer channel, In one embodiment, the first information occupies more aerial resources on the first type of physical layer channel than on the second type of physical layer channel.

In one embodiment, a transmit power used for the first type of physical layer channel is higher than a transmit power used for the second type of physical layer channel.

In one embodiment, the multi-antenna related transmitting used for the first type of physical layer channel is more robust than the multi-antenna related transmitting used for the second type of physical layer channel.

In one embodiment, a transmitting beam used for the first type of physical layer channel is wider than a transmitting beam used for the second type of physical layer channel.

In one embodiment, beam sweeping is used in transmitting the first information on the first type of physical layer channel.

In one embodiment, beam sweeping is not used in transmitting the first information on the second type of physical layer channel.

In one embodiment, the first type of physical layer channel is spatially related to an SS.

In one embodiment, a receiving beam used for receiving an SS is used for transmitting the first information on the first type of physical layer channel.

In one embodiment, a coefficient of a receiving beamforming vector used for receiving an SS is used for forming a transmitting beamforming vector transmitting the first information on the first type of physical layer channel.

In one embodiment, the second type of physical layer channel is spatially related to a CSI-RS.

In one embodiment, the second type of physical layer channel is spatially related to a Sounding Reference Signal (SRS).

In one embodiment, an analog beam used for SS is wider than an analog beam used for CSI-RS.

In one embodiment, an analog beam used for SS is wider than an analog beam used for SRS.

In one embodiment, the multi-antenna related receiving used for the target radio signal is more related to the multi-antenna related transmitting used for the second type of physical layer channel than to the multi-antenna related transmitting used for the first type of physical layer channel.

In one embodiment, the first type of physical layer channel is dedicated for transmitting the first information.

In one embodiment, the second type of physical layer channel is also used for transmitting information other than the first information.

In one embodiment, the first information is a beam recovery request.

In one embodiment, the beam recovery request is used for beam switching.

In one embodiment, the beam recovery request is used for the beam switching of PDCCH.

In one embodiment, the beam recovery request is used for the beam switching of PDSCH.

In one embodiment, the second information is used for determining whether to perform resynchronization.

In one embodiment, the second information is used for determining whether to enter an RLF state.

In one embodiment, the number of transmission times of the first information reaches K, and the UE does not transmit the first information any longer.

In one embodiment, the UE maintains a first counter, and the value of the first counter is equal to the number of transmission times of the first information.

In one embodiment, the UE maintains a second counter, and the value of the second counter is equal to a difference obtained when K minus the number of transmission times of the first information.

In one embodiment, the high layer refers to a layer higher than a physical layer in a network architecture.

In one embodiment, the high layer refers to a Medium Access Control (MAC) layer.

In one embodiment, the high layer refers to an application layer.

According to one aspect of the present disclosure, the method further includes the following step of:

maintaining the number of transmission times of the first information.

Herein, if the target channel is the first type of physical layer channel, the number of transmission times of the first information increases by 1; otherwise, the number of transmission times of the first information remains the same.

In one embodiment, the UE maintains a first counter, if the target channel is the first type of physical layer channel, the value of the first counter increases by 1; otherwise, the value of the first counter remains the same.

In one subembodiment, if the value of the first counter reaches K, the second information is transmitted to a high layer.

In one subembodiment, the initial value of the first counter is 0.

In one embodiment, the UE maintains a second counter, if the target channel is the first type of physical layer channel, the value of the second counter decreases by 1; otherwise, the value of the second counter remains the same.

In one subembodiment, if the value of the second counter reaches 0, the second information is transmitted to a high layer.

In one subembodiment, the initial value of the second counter is K.

According to one aspect of the present disclosure, the method further includes the following step of:

receiving a first signaling.

Herein, the first signaling is used for determining K.

In one embodiment, the above method is advantageous in that the number of retransmission times is flexibly configured according to the capabilities and situations of the system and the UE.

In one embodiment, the first signaling is a high layer signaling.

In one embodiment, the first signaling is an RRC signaling.

In one embodiment, the first signaling is a physical layer signaling.

In one embodiment, the first signaling is transmitted on a PDCCH.

In one embodiment, the first signaling indicates K explicitly.

In one embodiment, the first signaling indicates K implicitly.

According to one aspect of the present disclosure, the method further includes the following step of:

monitoring a first radio signal.

Herein, the first information is related to the multi-antenna related receiving of the first radio signal; if the UE receives the first radio signal within the first time window after transmitting the first information, the first information is no longer transmitted.

In one embodiment, the above method is advantageous in that the first information is used for the dynamic beam switching initiated by the UE and is beneficial for improving the efficiency of beam switching.

In one embodiment, the monitoring includes: the UE performs on a given time-frequency resource a blind decoding of the first radio signal.

In one embodiment, the monitoring includes: the UE does not determine whether the first radio signal is transmitted, before successful decoding.

In one embodiment, the first radio signal is transmitted on a PDCCH.

In one embodiment, the first information is used for determining a first reference signal, and the multi-antenna related receiving used for the radio signal is related to the multi-antenna related receiving used for the first reference signal.

In one embodiment, a receiving beam used for receiving the first reference signal is used for receiving the first radio signal.

In one embodiment, the multi-antenna related transmitting used for the radio signal is related to the multi-antenna related transmitting used for the first reference signal.

In one embodiment, a transmitting beam used for transmitting the first reference signal is used for transmitting the first radio signal.

In one embodiment, the first radio signal is spatially related to the first reference signal.

According to one aspect of the present disclosure, the method is characterized in that: the second information is used for triggering a resynchronization operation.

In one embodiment, the above method is advantageous in that the power of the UE used for transmitting the beam recovery request is saved, the time when the UE is out of synchronization is shortened, and the efficiency of transmission is improved.

In one embodiment, a high layer of the UE starts a resynchronization operation after receiving the second information.

In one embodiment, a high layer of the UE, after receiving the second information, judges whether to perform a resynchronization operation according to the state of a counter currently aiming at the resynchronization operation.

In one embodiment, if a high layer of the UE receives the second information and the value of a counter currently aiming at a resynchronization operation reaches a second threshold, the UE performs the resynchronization operation.

In one embodiment, the UE performs resynchronization using a Random Access Channel (RACH).

According to one aspect of the present disclosure, the method is characterized in that: after the first type of physical layer channel is used for the first time to transmit the first information, the second type of physical layer channel is not used to transmit the first information.

In one embodiment, the above method is advantageous in that the transmit power consumption of the UE is saved.

In one embodiment, before the first type of physical layer channel is used for the first time to transmit the first information, the first information is transmitted P times on the second type of physical layer channel, where in P is a positive integer.

In one embodiment, P is greater than 1.

In one embodiment, P is equal to 1.

In one embodiment, the first type of physical layer channel is used Q times to transmit the first information, wherein Q is a positive integer greater than 1.

In one embodiment, between any two times the first type of physical layer channel is used to transmit the first information, there is no probability that the second type of physical layer channel is used to transmit the first information.

The present disclosure provides a method in a base station device for wireless communication. The method includes the following steps of:

transmitting a target radio signal; and receiving first information on a target channel.

Herein, a channel measurement for the target radio signal is used for triggering the transmission of the first information; the target channel is a first type of physical layer channel or a second type of physical layer channel; if the target channel is the first type of physical layer channel, the transmission of the first information on the target channel is counted into the number of transmission times of the first information; otherwise, the number of transmission times of the first information is unrelated to the transmission of the first information on the target channel; the number of transmission times of the first information, when reaching K, is used for triggering a transmission of the second information to a high layer, wherein K is a positive integer.

In one embodiment, the channel measurement for the target radio signal is used for a third channel.

In one embodiment, the third channel is a PDCCH.

In one embodiment, the third channel is a PDSCH.

In one embodiment, the multi-antenna related transmitting of the target radio signal is related to the multi-antenna related transmitting used for the third channel.

In one embodiment, the same transmitting beam is used to transmit the target radio signal and the third channel.

In one embodiment, the target radio signal and the third channel are both spatially related to one same reference signal.

In one embodiment, an aerial resource for the first type of physical layer channel is preconfigured.

In one embodiment, the energy of the first type of physical layer channel is used for detecting whether the first type of physical layer channel is used to transmit the first information.

In one embodiment, a first signature sequence transmitted on the first type of physical layer channel is used for determining the first information.

In one embodiment, a signal intensity obtained when the base station makes the first signature sequence related to a signal received on the first type of physical layer channel is used for determining the first information.

In one embodiment, the PDCCH is used for configuring a time-frequency resource on which the second type of physical layer channel used for transmitting the first information is located.

In one embodiment, the value of the recovered bit blocks transmitted on the second type of physical layer channel is used for determining whether the second type of physical layer channel is used to transmit the first information.

According to one aspect of the present disclosure, the method includes the following step of:

transmitting a first signaling.

Herein, the first signaling is used for determining K.

According to one aspect of the present disclosure, the method includes the following step of:

transmitting a first radio signal.

Herein, the first information is related to the multi-antenna related transmitting of the first radio signal.

In one embodiment, the first information is used for determining a transmitting beam used for transmitting the first radio signal.

In one embodiment, the first information is used for determining a first reference signal, and the same transmitting beam is used for transmitting the first reference signal and the first radio signal.

According to one aspect of the present disclosure, the method is characterized in that the second information is used for triggering a resynchronization operation.

In one embodiment, the base station receives a resynchronization request of the UE through energy detection.

In one embodiment, a second signature sequence is used for determining the resynchronization request.

In one embodiment, a signal intensity obtained when the base station correlates the second signature sequence to a received signal is used for determining the first information.

In one embodiment, a signal intensity obtained when the base station makes the second signature sequence related to a signal received on the PRACH is used for determining the first information.

In one embodiment, the base station transmits a response to the resynchronization request of the UE.

According to one aspect of the present disclosure, the method is characterized in that: after the first type of physical layer channel is used for the first time to transmit the first information, the second type of physical layer channel is not used to transmit the first information.

The present disclosure provides a UE for wireless communication. The UE includes the following modules:

a first receiving module, to receive a target radio signal; and a second transmitting module, to transmit first information on a target channel.

Herein, a channel measurement for the target radio signal is used for triggering the transmission of the first information; the target channel is a first type of physical layer channel or a second type of physical layer channel; if the target channel is the first type of physical layer channel, the transmission of the first information on the target channel is counted into the number of transmission times of the first information; otherwise, the number of transmission times of the first information is unrelated to the transmission of the first information on the target channel; the number of transmission times of the first information, when reaching K, is used for triggering a transmission of the second information to a high layer, wherein K is a positive integer.

In one embodiment, the UE is characterized in that: the second transmitting module further maintains the number of transmission times of the first information, wherein if the target channel is the first type of physical layer channel, the number of transmission times of the first information increases by 1; otherwise, the number of transmission times of the first information remains the same.

In one embodiment, the UE is characterized in that: the first receiving module further receives a first signaling, wherein the first signaling is used for determining K.

In one embodiment, the UE is characterized in that: the first receiving module further monitors a first radio signal, wherein the first information is related to the multi-antenna related receiving of the first radio signal; if the UE receives the first radio signal within the first time window after transmitting the first information, the first information is no longer transmitted.

In one embodiment, the UE is characterized in that: the second information is used for triggering a resynchronization operation.

In one embodiment, the UE is characterized in that: after the first type of physical layer channel is used for the first time to transmit the first information, the second type of physical layer channel is not used to transmit the first information.

The present disclosure provides a base station device for wireless communication. The base station device includes:

a first transmitting module, to transmit a target radio signal; and a second receiving module, to receive first information on a target channel.

Herein, a channel measurement for the target radio signal is used for triggering the transmission of the first information; the target channel is a first type of physical layer channel or a second type of physical layer channel; if the target channel is the first type of physical layer channel, the transmission of the first information on the target channel is counted into the number of transmission times of the first information; otherwise, the number of transmission times of the first information is unrelated to the transmission of the first information on the target channel; the number of transmission times of the first information, when reaching K, is used for triggering a transmission of the second information to a high layer, wherein K is a positive integer.

In one embodiment, the base station device is characterized in that: the first transmitting module further transmits a first signaling, wherein the first signaling is used for determining K.

In one embodiment, the base station device is characterized in that: the first transmitting module further transmits a first radio signal, wherein the first information is related to the multi-antenna related transmitting of the first radio signal.

In one embodiment, the base station device is characterized in that: the second information is used for triggering a resynchronization operation.

In one embodiment, the base station device is characterized in that: after the first type of physical layer channel is used for the first time to transmit the first information, the second type of physical layer channel is not used to transmit the first information.

In one embodiment, compared with the prior art, the present disclosure has the following technical benefits:

the success rate of retransmission is improved;
flexible configuration is supported; and
the transmit power consumption of the UE is saved.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further detail in conjunction with the drawings. It should be noted that the embodiments in the present disclosure and the characteristics of the embodiments may be arbitrarily combined if there is no conflict.

Embodiment 1

Figure 1:
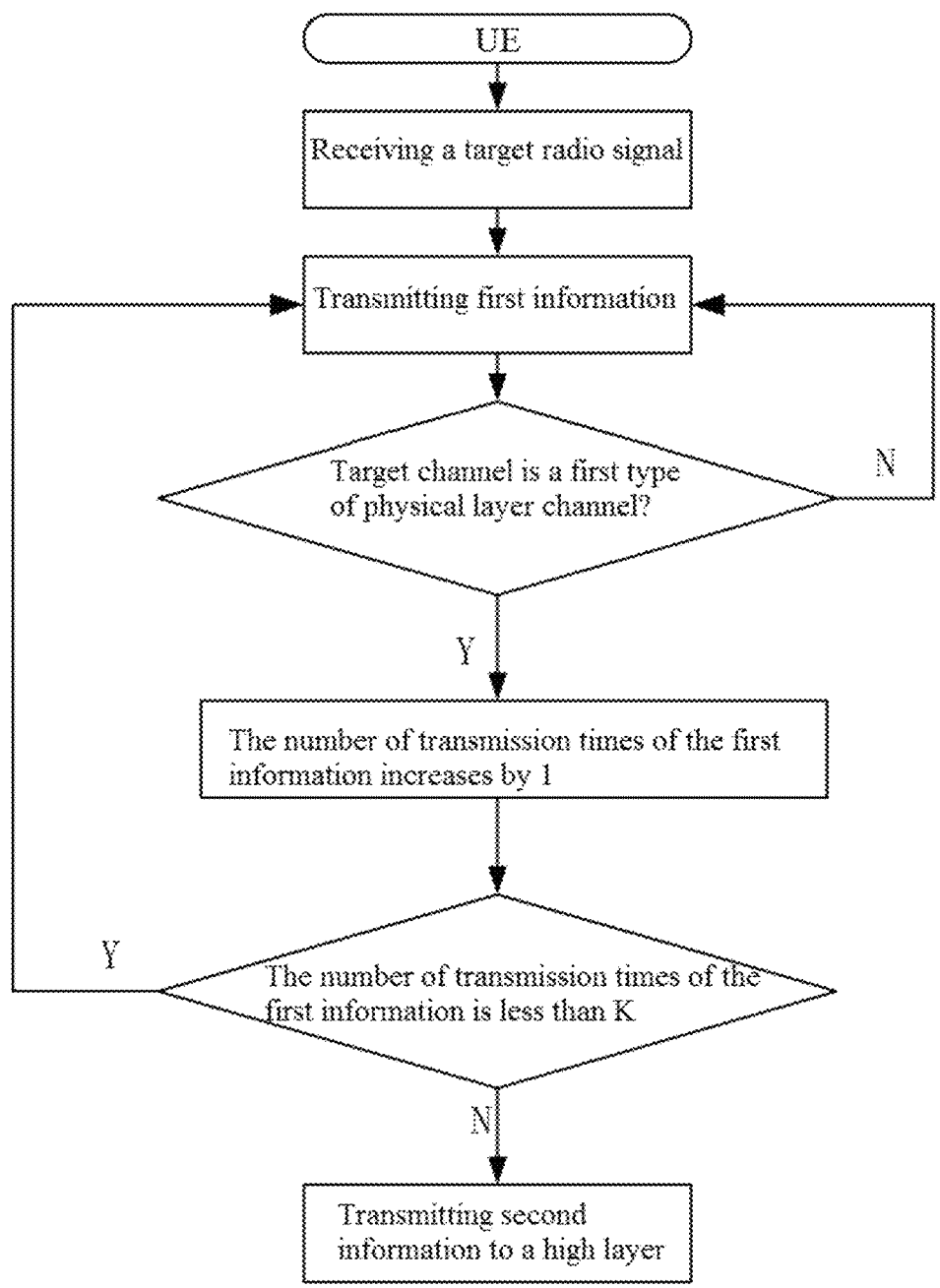
FIG. 1 is a flowchart according to one embodiment of the present disclosure.

Embodiment 1 illustrates an example of a flowchart according to the present disclosure, as shown in FIG. 1. In FIG. 1, each box represents a step.

In Embodiment 1, the UE in the present disclosure receives a target radio signal and transmits first information on a target channel in turn. A channel measurement for the target radio signal is used for triggering the transmission of the first information. The target channel is a first type of physical layer channel or a second type of physical layer channel. If the target channel is the first type of physical layer channel, the transmission of the first information on the target channel is counted into the number of transmission times of the first information. Otherwise, the number of transmission times of the first information is unrelated to the transmission of the first information on the target channel. The number of transmission times of the first information, when reaching K, is used for triggering a transmission of the second information to a high layer, wherein K is a positive integer.

In one subembodiment, the target radio signal is a PDCCH.

In one subembodiment, the target radio signal is a PDSCH.

In one subembodiment, the target radio signal is a CSI-RS.

In one subembodiment, the target radio signal is an SS.

In one subembodiment, the first type of physical layer channel is a PRACH.

In one subembodiment, the first type of physical layer channel is a PRACH like channel.

In one subembodiment, a signature sequence transmitted on the first type of physical layer channel is used for determining the first information.

In one subembodiment, the first type of physical layer channel is a contention free PRACH like channel In one subembodiment, a receiving beam used for receiving an SS is used for transmitting the first information on the first type of physical layer channel.

In one subembodiment, the second type of physical layer channel is a PUCCH.

In one subembodiment, the first information is carried in Uplink Control Information (UCI).

In one subembodiment, the first information corresponds to partial bits of one UCI, and the UCI also carries other uplink control information.

In one subembodiment, a transmit power used for transmitting the first information on the first type of physical layer channel is higher than a transmit power used for transmitting the first information on the second type of physical layer channel.

In one subembodiment, a time-frequency resource occupied by once of using the first type of physical layer channel is greater than a time-frequency resource occupied by once of using the second type of physical layer channel.

In one subembodiment, a transmitting beam used for transmitting the first information on the first type of physical layer channel is wider than a transmitting beam used for transmitting the first information on the second type of physical layer channel.

In one subembodiment, beam sweeping is used in transmitting the first information on the first type of physical layer channel, and beam sweeping is not used in transmitting the first information on the second type of physical layer channel.

In one subembodiment, beam sweeping is used in receiving the first information on the first type of physical layer channel, and beam sweeping is not used in receiving the first information on the second type of physical layer channel.

In one subembodiment, a time-frequency resource occupied by the first type of physical layer channel is preconfigured by the base station through an RRC signaling.

In one subembodiment, a time-frequency resource occupied by the second type of physical layer channel is preconfigured by the base station through an RRC signaling.

In one subembodiment, time-domain resources in a time-domain resource pool corresponding to the first type of physical layer channel are orthogonal to time-domain resources in a time-domain resource pool corresponding to the second type of physical layer channel.

In one subembodiment, the high layer is a MAC layer.

In one subembodiment, the second information is used by the UE to confirm entering an RLF state.

In one subembodiment, the second information is used by the UE to confirm entering an out of synchronization state.

In one subembodiment, the second information is used for initiating a resynchronization operation.

In one subembodiment, the target channel is not the first type of physical layer channel and the UE does not receive a response to the first information from the base station, then the first information is retransmitted.

In one subembodiment, the target channel is the first type of physical layer channel, and the number of transmission times of the first information increases by 1. If the number of transmission times of the first information is less than K, the first information is retransmitted; otherwise, the UE transmits the second information to a high layer.

Embodiment 2

Figure 2:
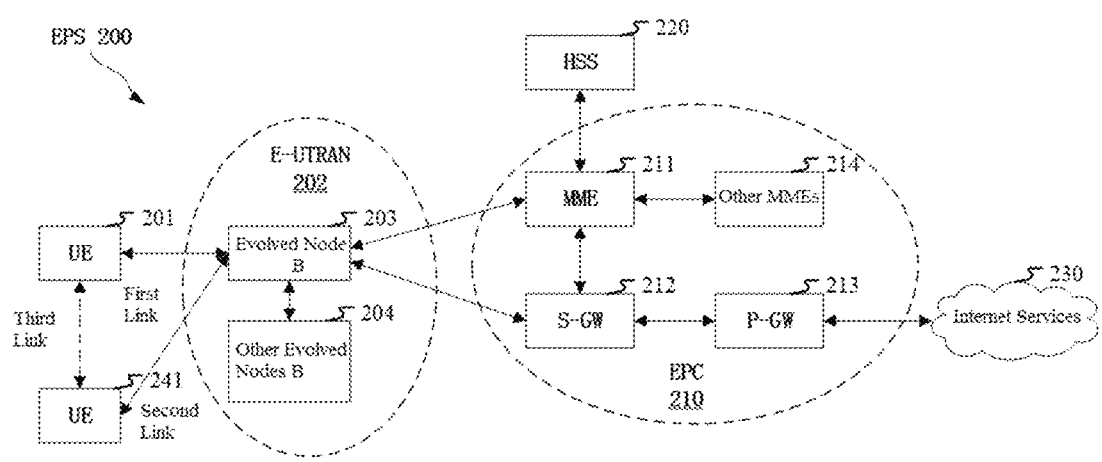
FIG. 2 is a diagram illustrating a network architecture according to one embodiment of the present disclosure.

Embodiment 2 illustrates an example of a diagram of a network architecture according to the present disclosure, as shown in FIG. 2. FIG. 2 is a diagram illustrating a system network architecture 200 of NR 5G Long-Term Evolution (LTE), Long-Term Evolution Advanced (LTE-A). The NR 5G or LTE network architecture 200 may be called an Evolved Packet System (EPS) 200. The EPS 200 may include one or more UEs 201, an NG-RAN 202, an Evolved Packet Core/5G-Core Network (EPC/5G-CN) 210, a Home Subscriber Server (HSS) 220 and an Internet Service 230. Herein, the EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services or other cellular networks. The NG-RAN includes an NR node B (gNB) 203 and other evolved nodes B (gNBs) 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the EPC/5G-CN 210 via an S1/NG interface. The EPC/5G-CN 210 includes an MME/AMF/UPF 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one subembodiment, the UE 201 corresponds to the UE in the present disclosure.

In one subembodiment, the gNB 203 corresponds to the base station in the present disclosure.

In one subembodiment, the UE 201 supports multi-antenna transmission.

In one subembodiment, the UE 201 supports analog beamforming.

In one subembodiment, the gNB 203 supports multi-antenna transmission.

In one subembodiment, the gNB 203 supports analog beamforming.

Embodiment 3

Figure 3:
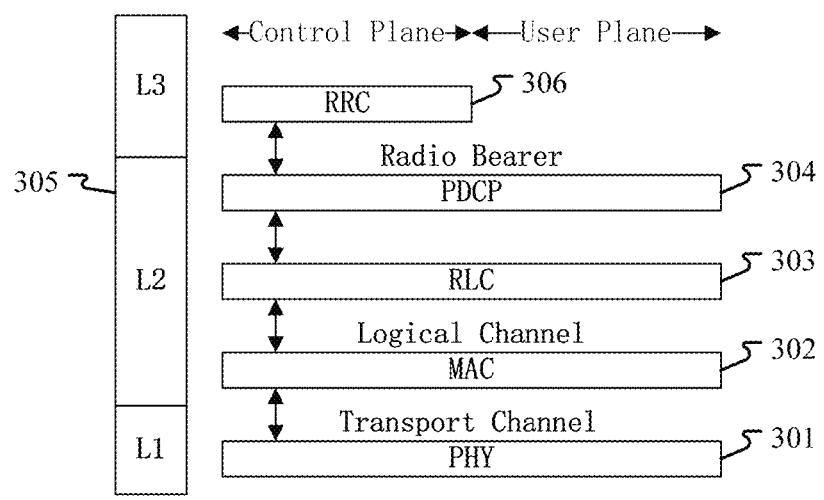
FIG. 3 is a diagram illustrating a radio protocol architecture of a user plane and a control plane according to one embodiment of the present disclosure.

Embodiment 3 is a diagram illustrating an embodiment of a radio protocol architecture of a user plane and a control plane according to the present disclosure, as shown in FIG. 3. FIG. 3 is a diagram illustrating an embodiment of a radio protocol architecture of a user plane and a control plane. In FIG. 3, the radio protocol architecture of a UE and a gNB is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one subembodiment, the radio protocol architecture in FIG. 3 is applicable to the UE in the present disclosure.

In one subembodiment, the radio protocol architecture in FIG. 3 is applicable to the base station device in the present disclosure.

In one subembodiment, the target radio signal in the present disclosure is generated by the PHY 301.

In one subembodiment, the first information in the present disclosure is generated by the PHY 301.

In one subembodiment, the second information in the present disclosure is generated by the PHY 301 and is transmitted to the MAC sublayer 302.

In one subembodiment, the first signaling in the present disclosure is generated by the PHY 301.

In one subembodiment, the first signaling in the present disclosure is generated by the MAC sublayer 302.

In one subembodiment, the first signaling in the present disclosure is generated by the RRC sublayer 306.

In one subembodiment, the first radio signal in the present disclosure is generated by the PHY 301.

Embodiment 4

Figure 4:
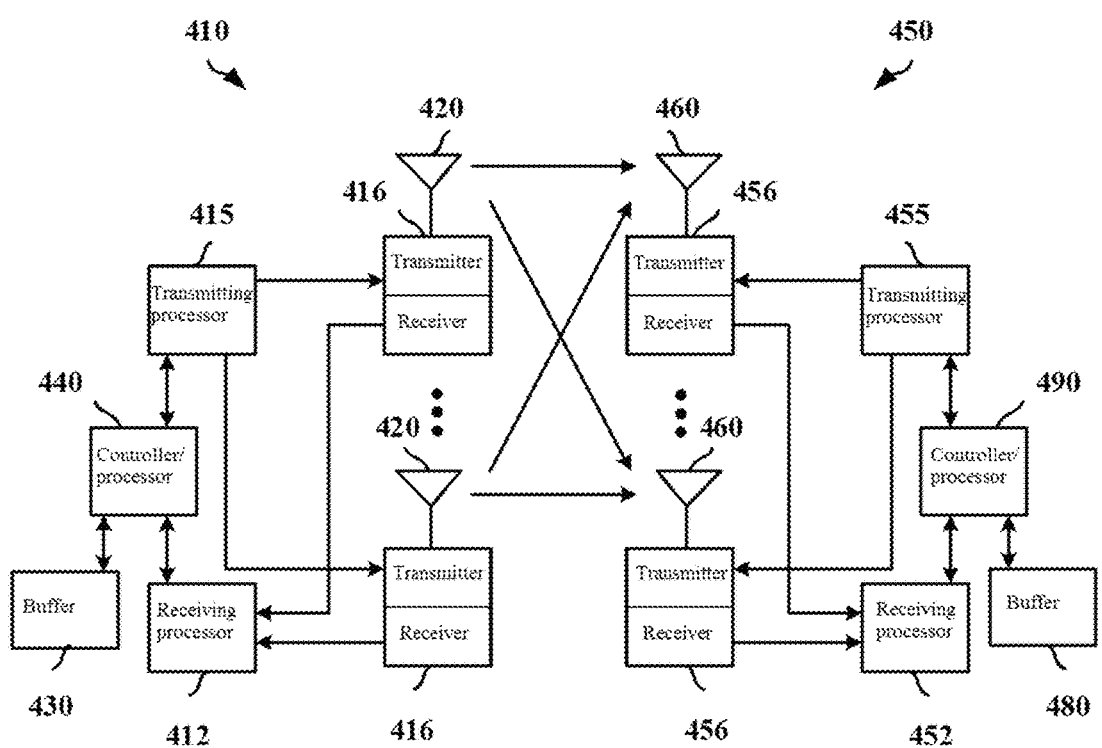
FIG. 4 is a diagram illustrating an evolved node B and a given UE according to one embodiment of the present disclosure.

Embodiment 4 illustrates a diagram of an evolved node B and a given UE according to the present disclosure, as shown in FIG. 4. FIG. 4 is a block diagram of a gNB 410 in communication with a UE 450 in an access network. In downlink transmission, a higher-layer packet coming from the core network is provided to a controller/processor 440. The controller/processor 440 provides functions of a layer 2. In downlink transmission, the controller/processor 440 provides header compression, encrypting, packet segmentation and reordering, multiplexing between a logical channel and a transport channel, and radio resource allocation for the UE 450 based on various priorities. The controller/processor 440 is also in charge of HARQ operation, retransmission of a lost packet, and a signaling to the UE 450. A transmitting processor 415 performs signal processing functions used for the layer 1 (that is, PHY). The signal processing function includes encoding and interleaving, so as to ensure an FEC (Forward Error Correction) and the mapping to corresponding signal clusters corresponding to each modulation scheme (i.e., BPSK, QPSK) at the UE 450 side. The encoded and modulated signals are divided into parallel streams. Each of the parallel streams is mapped into multi-carrier subcarriers and/or multi-carrier symbols, after the interleaving method of the present disclosure the modulated symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. The parallel streams subject to spatial precoding to generate multiple spatial streams. Each spatial stream is provided to different antennas 420 via the transmitter 416. Every transmitter 416 is used to transmit a corresponding spatial stream modulation RF (Radio Frequency) carrier. At the UE 450 side, every receiver 456 receives a signal via a corresponding antenna 460. Every receiver 456 recovers information modulated to the RF carrier and provides the information to a receiving processor 452. The receiving processor 452 performs signal receiving processing functions of the layer 1. The receiving processor 452 performs spatial processing on the information to recover any spatial stream targeting the UE 450. The receiving processor 452 then converts the multi-carrier symbol stream from time domain into frequency domain using FFT. A frequency domain signal includes a single multi-carrier symbol stream of each subcarrier used for multi-carrier signals. The symbol and reference signal on each subcarrier are recovered and demodulated by determining the most possible signal cluster point transmitted by the gNB 410, and generate a soft decision. The soft decision is then decoded and de-interleaved so as to recover the original data and control signal transmitted by the gNB 410 on the physical channel. The data and control signal are then provided to a controller/processor 490. The controller/processor 490 performs functions of the layer 2. The controller/processor can be connected to a memory 480 that stores program code and data. The memory 480 is a computer readable medium.

In one subembodiment, the UE 450 includes at least one processor and at least one memory. The at least one memory includes computer program codes. The at least one memory and the computer program codes are configured to be used in collaboration with the at least one processor. The UE 450 at least receives a target radio signal, and transmits first information on a target channel; wherein a channel measurement for the target radio signal is used for triggering the transmission of the first information; the target channel is a first type of physical layer channel or a second type of physical layer channel; if the target channel is the first type of physical layer channel, the transmission of the first information on the target channel is counted into the number of transmission times of the first information; otherwise, the number of transmission times of the first information is unrelated to the transmission of the first information on the target channel; the number of transmission times of the first information, when reaching K, is used for triggering a transmission of the second information to a high layer, wherein K is a positive integer.

In one subembodiment, the UE 450 includes a memory that stores a computer readable instruction program. The computer readable instruction program generates an action when executed by at least one processor. The action includes: receiving a target radio signal, and transmitting first information on a target channel; wherein a channel measurement for the target radio signal is used for triggering the transmission of the first information; the target channel is a first type of physical layer channel or a second type of physical layer channel; if the target channel is the first type of physical layer channel, the transmission of the first information on the target channel is counted into the number of transmission times of the first information; otherwise, the number of transmission times of the first information is unrelated to the transmission of the first information on the target channel; the number of transmission times of the first information, when reaching K, is used for triggering a transmission of the second information to a high layer, wherein K is a positive integer.

In one subembodiment, the gNB 410 includes at least one processor and at least one memory. The at least one memory includes computer program codes. The at least one memory and the computer program codes are configured to be used in collaboration with the at least one processor. The gNB 410 at least transmits a target radio signal, and receives first information on a target channel; wherein a channel measurement for the target radio signal is used for triggering the transmission of the first information; the target channel is a first type of physical layer channel or a second type of physical layer channel; if the target channel is the first type of physical layer channel, the transmission of the first information on the target channel is counted into the number of transmission times of the first information; otherwise, the number of transmission times of the first information is unrelated to the transmission of the first information on the target channel; the number of transmission times of the first information, when reaching K, is used for triggering a transmission of the second information to a high layer, wherein K is a positive integer.

In one subembodiment, the gNB 410 includes a memory that stores a computer readable instruction program. The computer readable instruction program generates an action when executed by at least one processor. The action includes: transmitting a target radio signal, and receiving first information on a target channel; wherein a channel measurement for the target radio signal is used for triggering the transmission of the first information; the target channel is a first type of physical layer channel or a second type of physical layer channel; if the target channel is the first type of physical layer channel, the transmission of the first information on the target channel is counted into the number of transmission times of the first information; otherwise, the number of transmission times of the first information is unrelated to the transmission of the first information on the target channel; the number of transmission times of the first information, when reaching K, is used for triggering a transmission of the second information to a high layer, wherein K is a positive integer.

In one subembodiment, the UE 450 corresponds to the UE in the present disclosure.

In one subembodiment, the gNB 410 corresponds to the base station in the present disclosure.

In one subembodiment, at least one of the transmitting processor 415 and the controller/processor 440 is used for transmitting the target radio signal in the present disclosure.

In one subembodiment, at least one of the receiving processor 452 and the controller/processor 490 is used for receiving the target radio signal in the present disclosure.

In one subembodiment, at least one of the transmitting processor 455 and the controller/processor 490 is used for transmitting the first information in the present disclosure.

In one subembodiment, at least one of the receiving processor 412 and the controller/processor 440 is used for receiving the first information in the present disclosure.

In one subembodiment, at least one of the transmitting processor 415 and the controller/processor 440 is used for transmitting the first signaling in the present disclosure.

In one subembodiment, at least one of the receiving processor 452 and the controller/processor 490 is used for receiving the first signaling in the present disclosure.

In one subembodiment, at least one of the transmitting processor 415 and the controller/processor 440 is used for transmitting the first radio signal in the present disclosure.

In one subembodiment, at least one of the receiving processor 452 and the controller/processor 490 is used for monitoring the first radio signal in the present disclosure.

Embodiment 5

Figure 5:
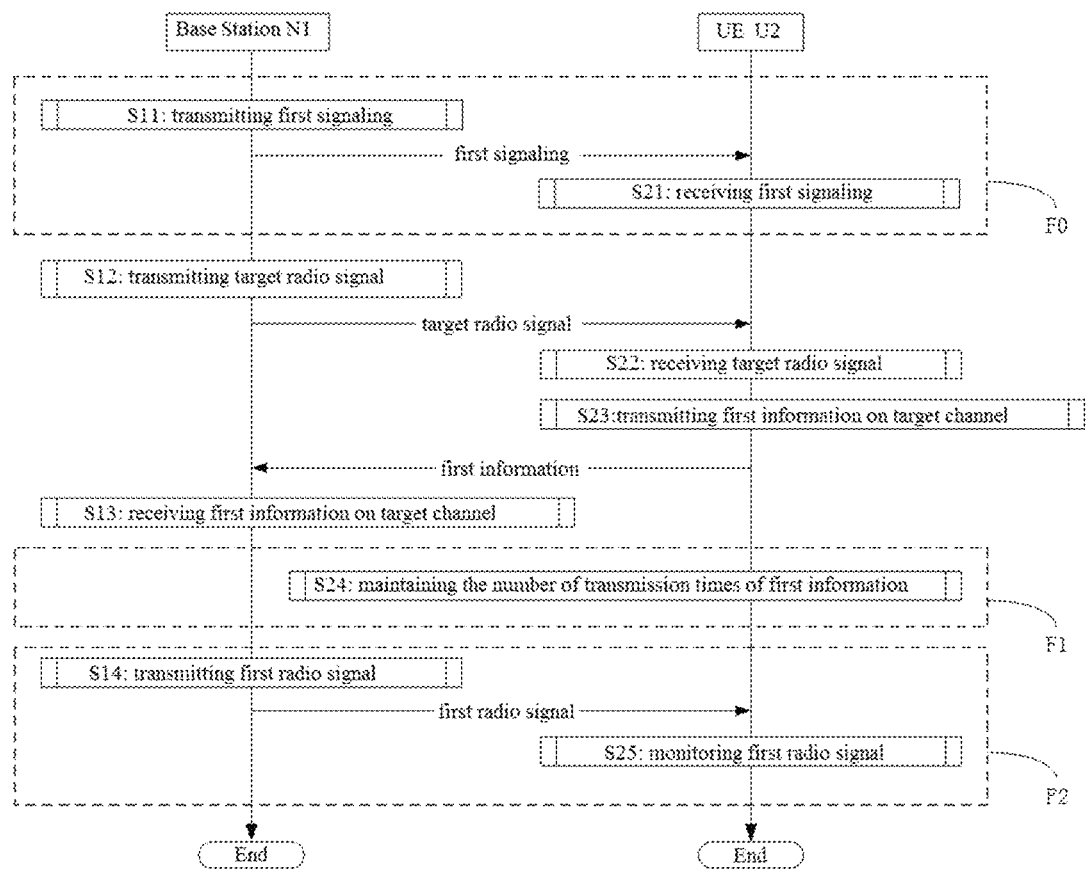
FIG. 5 is a flowchart illustrating the transmission of a radio signal according to one embodiment of the present disclosure.

Embodiment 5 illustrates an example of a flowchart of the transmission of a radio signal according to the present disclosure, as shown in FIG. 5. In FIG. 5, the base station N1 is a maintenance base station for a serving cell of the UE U2. In FIG. 5, steps marked by box F0, box F1 and box F2 are optional.

The base station N1 transmits a first signaling in S11, transmits a target radio signal in S12, receives first information on a target channel in S13, and transmits a first radio signal in S14.

The UE U2 receives the first signaling in S21, receives the target radio signal in S22, transmits the first information on the target channel in S23, maintains the number of transmission times of the first information in S24, and monitors the first radio signal in S25.

In Embodiment 5, a channel measurement for the target radio signal is used by the U2 to trigger the transmission of the first information; the target channel is a first type of physical layer channel or a second type of physical layer channel; if the target channel is the first type of physical layer channel, the transmission of the first information on the target channel is counted by the U2 into the number of transmission times of the first information; otherwise, the number of transmission times of the first information is unrelated to the transmission of the first information on the target channel; the number of transmission times of the first information, when reaching K, is used by the U2 to trigger a transmission of the second information to a high layer, wherein K is a positive integer.

In one subembodiment, the step in box F1 exists; if the target channel is the first type of physical layer channel, the number of transmission times of the first information increases by 1; otherwise, the number of transmission times of the first information remains the same.

In one subembodiment, the step in box F0 exists; the first signaling is used by the U2 to determine K.

In one subembodiment, the step in box F2 exists; the first information is used by the N1 to determine the multi-antenna related transmitting of the first radio signal; the first information is related to the multi-antenna related receiving of the first radio signal at the U2; if the U2 receives the first radio signal within the first time window after transmitting the first information, the first information is no longer transmitted.

In one subembodiment, the second information is used by the U2 to trigger a resynchronization operation.

In one subembodiment, after the first type of physical layer channel is used by the U2 for the first time to transmit the first information, the second type of physical layer channel is not used by the U2 to transmit the first information.

In the condition that there is no conflict, the above subembodiments may be arbitrarily combined.

Embodiment 6

Figure 6:
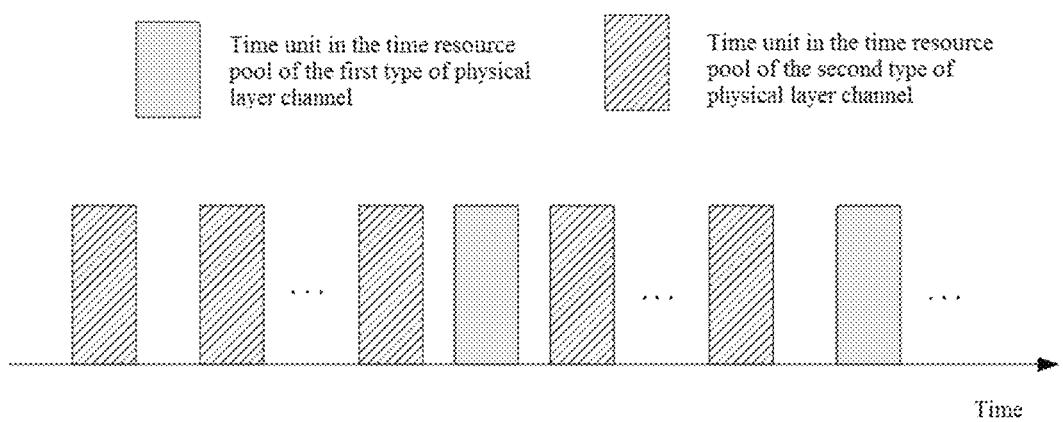
FIG. 6 is a diagram illustrating time-domain resources of a first type of physical layer channel and a second type of physical layer channel according to one embodiment of the present disclosure.

Embodiment 6 illustrates an example of time-domain resources of a first type of physical layer channel and a second type of physical layer channel, as shown in FIG. 6. The rectangle filled by gray color represents a time unit in a time resource pool of the first type of physical layer channel. The rectangle filled by slashes represents a time unit in a time resource pool of the second type of physical layer channel.

In Embodiment 6, the time-domain resource of the first type of physical layer channel is orthogonal to the time-domain resource of the second type of physical layer channel. First information is transmitted on the first type of physical layer channel or the second type of physical layer channel.

In one subembodiment, the time-domain resource of the first type of physical layer channel is configured by a high layer signaling.

In one subembodiment, the time-domain resource of the second type of physical layer channel is configured by a high layer signaling.

In one subembodiment, the time-domain resource of the second type of physical layer channel is configured by default.

In one subembodiment, the time-domain resource of the second type of physical layer channel is configured by a PDCCH.

In one subembodiment, in time domain, one time unit in the time resource pool of the first type of physical layer channel is longer than one time unit in the time resource pool of the second type of physical layer channel.

In one subembodiment, before the first type of physical layer channel is used to transmit the first information, the second type of physical layer channel is used to transmit the first information.

In one subembodiment, the first type of physical layer channel is a PRACH.

In one subembodiment, a signature sequence is used to transmit the first information on the first type of physical layer channel.

In one subembodiment, the second type of physical layer channel is a PUCCH.

Embodiment 7

Figure 7:
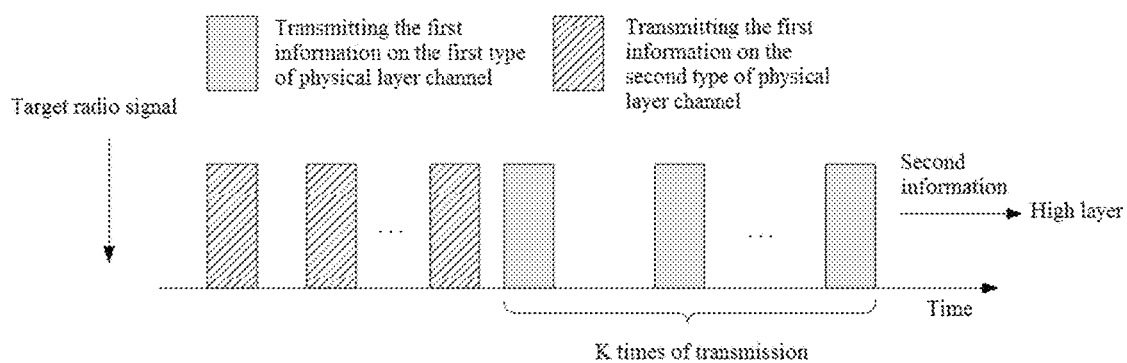
FIG. 7 is a diagram illustrating a situation in which the second type of physical layer channel is not used to transmit the first information after the first type of physical layer channel is used for the first time to transmit the first information according to one embodiment of the present disclosure.

Embodiment 7 illustrates an example of a situation in which the second type of physical layer channel is not used to transmit the first information after the first type of physical layer channel is used for the first time to transmit the first information, as shown in FIG. 7. The rectangle filled by gray color represents transmitting the first information on the first type of physical layer channel. The rectangle filled by slashes represents transmitting the first information on the second type of physical layer channel.

In Embodiment 7, a UE receives a target radio signal, and transmits the first information on the first type of physical layer channel or on the second type of physical layer channel. The UE first uses the second type of physical layer channel to transmit the first information, then uses the first type of physical layer channel to transmit the first information. After the first type of physical layer channel is used for the first time to transmit the first information, the second type of physical layer channel is not used to transmit the first information. After the first type of physical layer channel is used K times, the UE transmits second information to a high layer and stops transmitting the first information.

In one subembodiment, the first type of physical layer channel used for the first time to transmit the first information is a time unit, closest to the target radio signal, in a preconfigured time-domain resource pool corresponding to the first type of physical layer channel.

In one subembodiment, before the UE uses the first type of physical layer channel to transmit the first information, the UE receives a DCI on PDCCH, which indicates to transmit the first information on the second type of physical layer channel.

In one subembodiment, the second type of physical layer channel is a PUCCH.

In one subembodiment, the UE monitors a first radio signal, within a time window after each transmission of the first information. The first radio signal is a response to the first information by the base station. The UE does not detect the first radio signal within the time window, and the number of times the second type of physical layer channel is used to transmit the first information is less than K, then the first information is retransmitted on the first type of physical layer channel or on the second type of physical layer channel.

Embodiment 8

Figure 8:
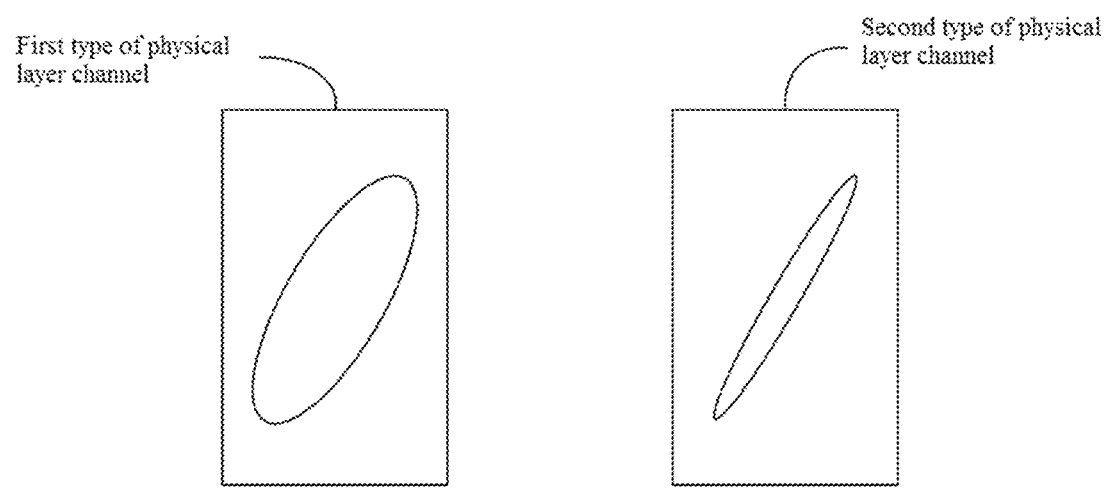
FIG. 8 is a diagram illustrating a situation in which different transmitting beams are used for the first type of physical layer channel and the second type of physical layer channel according to one embodiment of the present disclosure.

Embodiment 8 illustrates an example of a situation in which different transmitting beams are used for the first type of physical layer channel and the second type of physical layer channel, as shown in FIG. 8.

In Embodiment 8, a wider transmitting beam is used for transmitting the first information on the first type of physical layer channel, and a narrower transmitting beam is used for transmitting the first information on the second type of physical layer channel.

In one subembodiment, a transmit power used for transmitting the first information on the first type of physical layer channel is higher than a transmit power used for transmitting the first information on the second type of physical layer channel.

In one subembodiment, a receiving beam used for receiving an SS is used for transmitting the first information on the first type of physical layer channel.

In one subembodiment, a transmitting beam used for transmitting an SRS is used for transmitting the first information on the second first type of physical layer channel.

In one subembodiment, a receiving beam used for receiving a CSI-RS is used for transmitting the first information on the second type of physical layer channel.

Embodiment 9

Figure 9:
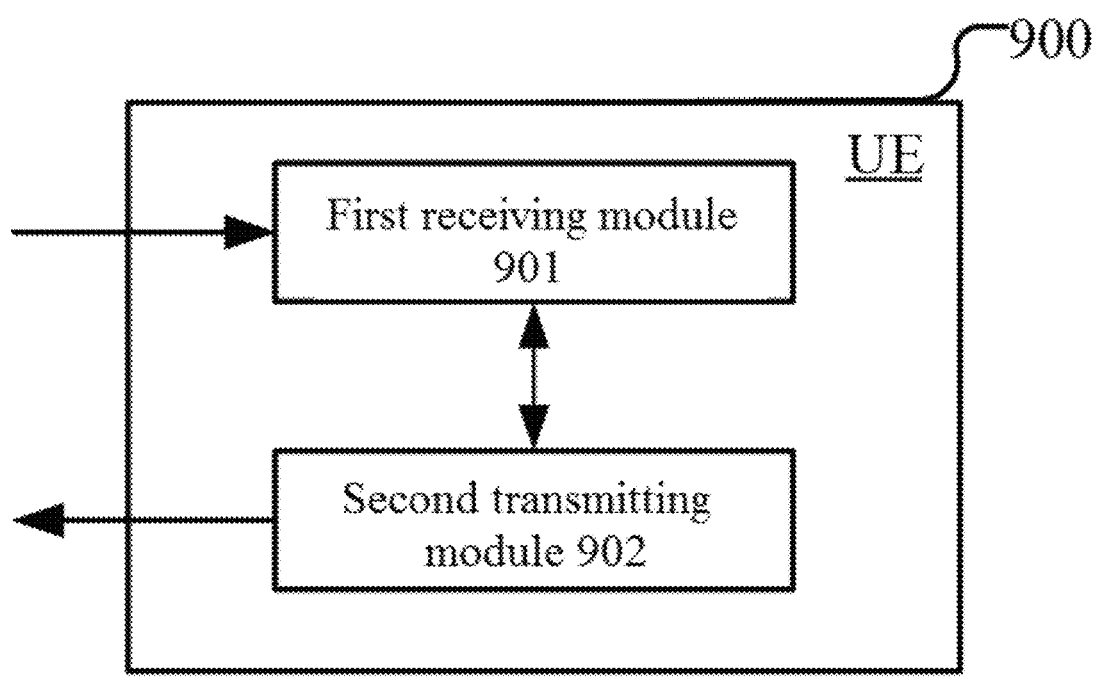
FIG. 9 is a structure block diagram illustrating a processing device in a UE according to one embodiment of the present disclosure.

Embodiment 9 illustrates an example of a structure block diagram of a processing device in a UE, as shown in FIG. 9. In FIG. 9, the processing device 900 of the UE is mainly composed of a first receiving module 901 and a second transmitting module 902.

In Embodiment 9, the first receiving module 901 receives a target radio signal, and the second transmitting module 902 transmits first information on a target channel.

In Embodiment 9, a channel measurement for the target radio signal is used for triggering the transmission of the first information; the target channel is a first type of physical layer channel or a second type of physical layer channel; if the target channel is the first type of physical layer channel, the transmission of the first information on the target channel is counted into the number of transmission times of the first information; otherwise, the number of transmission times of the first information is unrelated to the transmission of the first information on the target channel; the number of transmission times of the first information, when reaching K, is used for triggering a transmission of the second information to a high layer, wherein K is a positive integer.

In one subembodiment, the second transmitting module 902 further maintains the number of transmission times of the first information, wherein if the target channel is the first type of physical layer channel, the number of transmission times of the first information increases by 1; otherwise, the number of transmission times of the first information remains the same.

In one subembodiment, the first receiving module 901 further receives a first signaling, wherein the first signaling is used for determining K.

In one subembodiment, the first receiving module 901 further monitors a first radio signal, wherein the first information is related to the multi-antenna related receiving of the first radio signal; if the UE receives the first radio signal within the first time window after transmitting the first information, the first information is no longer transmitted.

In one subembodiment, the second information is used for triggering a resynchronization operation.

In one subembodiment, after the first type of physical layer channel is used for the first time to transmit the first information, the second type of physical layer channel is not used to transmit the first information.

Embodiment 10

Figure 10:
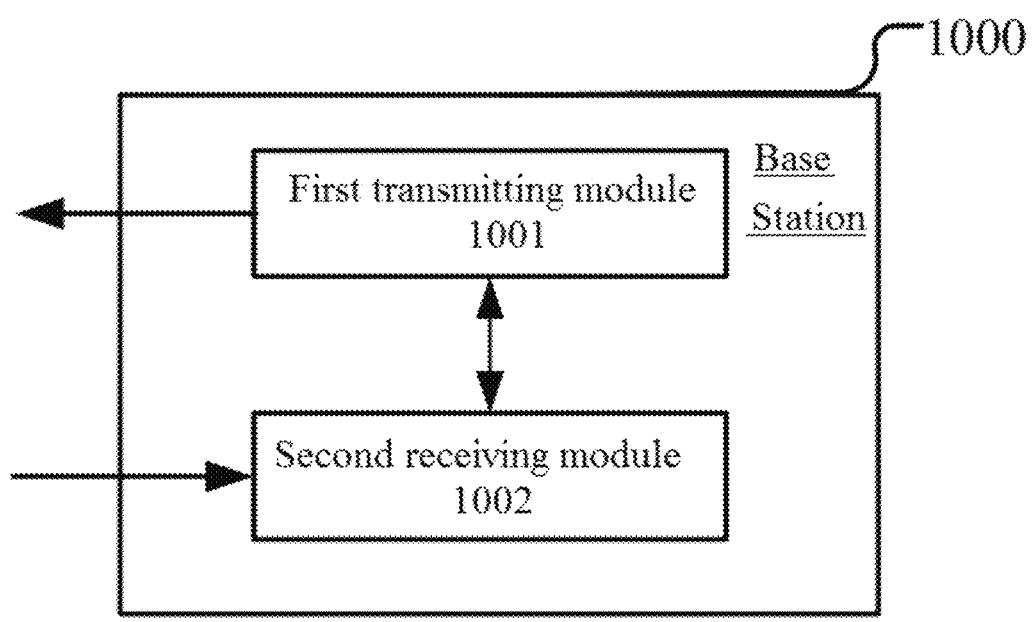
FIG. 10 is a structure block diagram illustrating a processing device in a base station according to one embodiment of the present disclosure.

Embodiment 10 illustrates an example of a structure block diagram of a processing device in a base station, as shown in FIG. 10. In FIG. 10, the processing device 1000 of the base station is mainly composed of a first transmitting module 1001 and a second receiving module 1002.

In Embodiment 10, the first transmitting module 1001 transmits a target radio signal, and the second receiving module 1002 receives first information on a target channel.

In Embodiment 10, a channel measurement for the target radio signal is used for triggering the transmission of the first information; the target channel is a first type of physical layer channel or a second type of physical layer channel; if the target channel is the first type of physical layer channel, the transmission of the first information on the target channel is counted into the number of transmission times of the first information; otherwise, the number of transmission times of the first information is unrelated to the transmission of the first information on the target channel; the number of transmission times of the first information, when reaching K, is used for triggering a transmission of the second information to a high layer, wherein K is a positive integer.

In one subembodiment, the first transmitting module 1001 further transmits a first signaling, wherein the first signaling is used for determining K.

In one subembodiment, the first transmitting module 1001 further transmits a first radio signal, wherein the first information is related to the multi-antenna related transmitting of the first radio signal.

In one subembodiment, the second information is used for triggering a resynchronization operation.

In one subembodiment, after the first type of physical layer channel is used for the first time to transmit the first information, the second type of physical layer channel is not used to transmit the first information.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure includes but not limited to mobile phones, tablet computers, notebooks, network cards, low-power equipment, enhanced MTC (eMTC) equipment, NB-IoT equipment, vehicle-mounted communication equipment, and other wireless communication equipment. The base station or network side equipment in the present application includes but not limited to macro-cellular base stations, micro-cellular base stations, home base stations, relay base station, eNB, gNB, TRP, and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
   receiving a target radio signal; and
   transmitting first information on a target channel;
      wherein a channel measurement for the target radio signal is used for triggering the transmission of the first information; the target channel is a first type of physical layer channel or a second type of physical layer channel; if the target channel is the first type of physical layer channel, the transmission of the first information on the target channel is counted into a number of transmission times of the first information; otherwise, the number of transmission times of the first information is unrelated to the transmission of the first information on the target channel; the number of transmission times of the first information, when reaching K, is used for triggering a transmission of a second information, different from the first information, to a high layer, wherein K is a positive integer.

2. The method according to claim 1, further comprising: maintaining the number of transmission times of the first information;
   wherein if the target channel is the first type of physical layer channel, the number of transmission times of the first information increases by 1; otherwise, the number of transmission times of the first information remains the same.

3. The method according to claim 1, further comprising: receiving a first signaling;
   wherein the first signaling is used for determining K.

4. The method according to claim 1, further comprising: monitoring a first radio signal;
   wherein the first information is related to a multi-antenna related receiving of the first radio signal; if the UE receives the first radio signal within the first time window after transmitting the first information, the first information is no longer transmitted.

5. The method according to claim 1, wherein the second information is used for triggering a resynchronization operation.

6. A method in a base station device for wireless communication, comprising:
   transmitting a target radio signal; and
   receiving first information on a target channel;
      wherein a channel measurement for the target radio signal is used for triggering the transmission of the first information; the target channel is a first type of physical layer channel or a second type of physical layer channel; if the target channel is the first type of physical layer channel, the transmission of the first information on the target channel is counted into a number of transmission times of the first information; otherwise, the number of transmission times of the first information is unrelated to the transmission of the first information on the target channel; the number of transmission times of the first information, when reaching K, is used for triggering a transmission of a second information, different from the first information, to a high layer, wherein K is a positive integer.

7. The method according to claim 6, further comprising: transmitting a first signaling;
   wherein the first signaling is used for determining K.

8. The method according to claim 6, further comprising: transmitting a first radio signal;
   wherein the first information is related to a multi-antenna related transmitting of the first radio signal.

9. The method according to claim 6, wherein the second information is used for triggering a resynchronization operation.

10. A UE for wireless communication, comprising:
    a first receiving module, to receive a target radio signal; and
    a second transmitting module, to transmit first information on a target channel;
       wherein a channel measurement for the target radio signal is used for triggering the transmission of the first information; the target channel is a first type of physical layer channel or a second type of physical layer channel; if the target channel is the first type of physical layer channel, the transmission of the first information on the target channel is counted into a number of transmission times of the first information; otherwise, the number of transmission times of the first information is unrelated to the transmission of the first information on the target channel; the number of transmission times of the first information, when reaching K, is used for triggering a transmission of a second information, different from the first information, to a high layer, wherein K is a positive integer.

11. The UE according to claim 10, wherein the second transmitting module maintains the number of transmission times of the first information, wherein if the target channel is the first type of physical layer channel, the number of transmission times of the first information increases by 1; otherwise, the number of transmission times of the first information remains the same.

12. The UE according to claim 10, wherein the first receiving module receives a first signaling, wherein the first signaling is used for determining K.

13. The UE according to claim 10, wherein the first receiving module monitors a first radio signal, wherein the first information is related to a multi-antenna related receiving of the first radio signal; if the UE receives the first radio signal within the first time window after transmitting the first information, the first information is no longer transmitted.

14. The UE according to claim 10, wherein the second information is used for triggering a resynchronization operation.

15. A base station device for wireless communication, comprising:
    a first transmitting module, to transmit a target radio signal; and
    a second receiving module, to receive first information on a target channel;
       wherein a channel measurement for the target radio signal is used for triggering the transmission of the first information; the target channel is a first type of physical layer channel or a second type of physical layer channel; if the target channel is the first type of physical layer channel, the transmission of the first information on the target channel is counted into a number of transmission times of the first information; otherwise, the number of transmission times of the first information is unrelated to the transmission of the first information on the target channel; the number of transmission times of the first information, when reaching K, is used for triggering a transmission of a second information, different from the first information, to a high layer, wherein K is a positive integer.

16. The base station device according to claim 15, wherein the first transmitting module transmits a first signaling, wherein the first signaling is used for determining K.

17. The base station device according to claim 15, wherein the first transmitting module transmits a first radio signal, wherein the first information is related to a multi-antenna related transmitting of the first radio signal.

18. The base station device according to claim 15, wherein the second information is used for triggering a resynchronization operation.

* * * * *